United States Patent [19]

Haneda et al.

[11] Patent Number: 4,507,743
[45] Date of Patent: Mar. 26, 1985

[54] CALCULATION SYSTEM UTILIZING DEFINABLE KEYS

[75] Inventors: Isamu Haneda; Tetsuo Myooi, both of Nara, Japan

[73] Assignee: Sharp Kabushiki Kaisha, Osaka, Japan

[21] Appl. No.: 535,552

[22] Filed: Sep. 27, 1983

Related U.S. Application Data

[63] Continuation of Ser. No. 233,506, Feb. 11, 1981, abandoned.

[30] Foreign Application Priority Data

Feb. 12, 1980 [JP] Japan .................................. 55-15677

[51] Int. Cl.³ .............................................. G06F 15/06
[52] U.S. Cl. ..................................... 364/709; 364/200
[58] Field of Search ................ 364/709, 706, 200, 900

[56] References Cited

U.S. PATENT DOCUMENTS 4,145,742  3/1979  Olander, Jr. et al. ............... 364/709
4,152,769  5/1979  Olander, Jr. et al. ............... 364/709

Primary Examiner—David H. Malzahn
Attorney, Agent, or Firm—Birch, Stewart, Kolasch & Birch

[57] ABSTRACT

In a preferred form of the present invention, upon operation of a particular key a calculator runs a stored program, beginning with a step in the stored program as selected by that particular key. If the program contains a particular instruction at that beginning step, then the calculator serves to insert previous information displayed before the operation of the particular key into a variable column as specified by the instruction.

3 Claims, 7 Drawing Figures

| LINE NO. | LABEL | INSTRUCTION | : | INSTRUCTION | : | INSTRUCTION | INTER |

10  ▼A▼  AREAD A(10) : GOSUB 300

FIG.6

| PROGRAM | |
|---|---|
| 10 : | ▼A▼ AREAD  X |
| 20 : | Y = 10 |
| 30 : | ▼B▼ AREAD  Y |
| 40 : | PAUSE  X |
| 50 : | PAUSE  Y |
| 60 : | END |

FIG.7

| KEY OPERATION (DEF MODE) | DISPLAY |
|---|---|
|  | > |
| 5 ✕ 6 | 5 ✳ 6 _ |
| SHIFT  A | 5 ✳ 6 _ |
|  | 30. |
|  | 10. |
|  | > |
| 8 ✕ 2 | 8 ✳ 2 _ |
| SHIFT  B | 8 ✳ 2 _ |
|  | 30. |
|  | 16. |
|  | > |

CALCULATION SYSTEM UTILIZING DEFINABLE KEYS

This application is a continuation, of application Ser. No. 233,506 filed on Feb. 11, 1981 now abandoned.

BACKGROUND OF THE INVENTION

This invention relates to a system for executing programmed calculations in programmable calculators.

It is often desirable to load information into a particular memory location addressed by a particular variable prior to running a stored program in electronic calculators and personal computers which enable the operator to write and run programs (these will be referred to as "calculators" hereafter). For example, conventional calculators with BASIC language programming capabilities are adapted such that, if a stored program contains an INPUT statement or instruction, it runs the stored program and, after introducing keyed information when coming across that INPUT statement, continues running the stored program. When input information is a calculation formula, it is therefore difficult to run the program after the result of such a calculation is evaluated and inserted into a particular variable in the stored program. Furthermore, when the stored program has more than one starting point which contains a variable, necessary key operations are troublesome since the starting points should be identified to run the stored program.

OBJECTS AND SUMMARY OF THE INVENTION

It is therefore an object of the present invention to provide a calculator having the capability of accepting desired keyed information upon simple key actuation while running a stored program.

In accordance with a preferred embodiment of the present invention, upon operation of a particular key a calculator runs a stored program, beginning with a step in the stored program as selected by that particular key. If the program contains a particular instruction at that beginning step, then the calculator serves to insert previous information displayed before the operation of the particular key into a variable column as specified by the instruction.

BRIEF DESCRIPTION OF THE DRAWINGS

For a more complete understanding of the present invention and for further objects and advantages thereof, reference is now made to the following description taken in conjunction with the accompanying drawings, in which:

FIG. 6 shows another example of a calculation program; and

FIG. 7 is a view of an example of data displayed on a display according to the calculation program of FIG. 6.

DETAILED DESCRIPTION OF THE INVENTION

Figure 1:
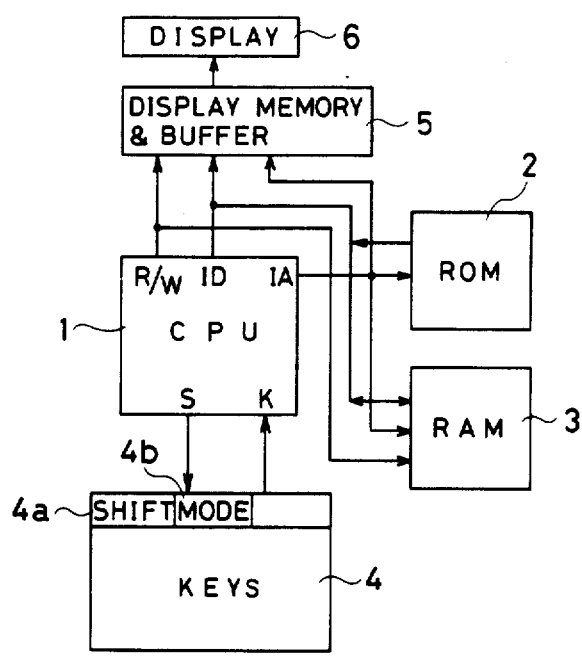
FIG. 1 is a block diagram of an embodiment of the present invention.

Referring now to FIG. 1, there is illustrated a schematic block diagram of a programmable calculator in accordance with an embodiment of the present invention, which includes a central processing unit (CPU) 1, a read only memory (ROM) 2, a random access memory (RAM) 3, keys 4, a display memory and buffer 5 and a display panel 6 for providing a digital display of the results of calculations by CPU 1, etc, and input data.

CPU 1 accepts keyed information via the keys 4 and executes desired calculations based on a programmed sequence stored in ROM 2, loads data to be displayed on the display panel into the display memory 5 and, if the situation so requires, loads the keyed information into RAM 3 or permits the contents of RAM 3 to be displayed on the display panel 6. As is well known in the art, CPU 1 has an address bus 1A, a data bus 1D and a read/write port R/W all of which are supplied with signals generated by a string of microinstructions from an instruction decoder and timing signals.

ROM 2 contains sequences (monitor) for introducing and displaying keyed information and sequences (interpreter) responsive to stored programs in RAM 3.

RAM 3 stores programs and data. The keys 4 comprises digit keys, four rule keys, a clear key, an ENTER key, a SHIFT key 4a, a mode key 4b and other keys. Code signals indicative of the respective ones of the keys are obtained from a matrix of strobe signals S and key signals K.

Figure 2:
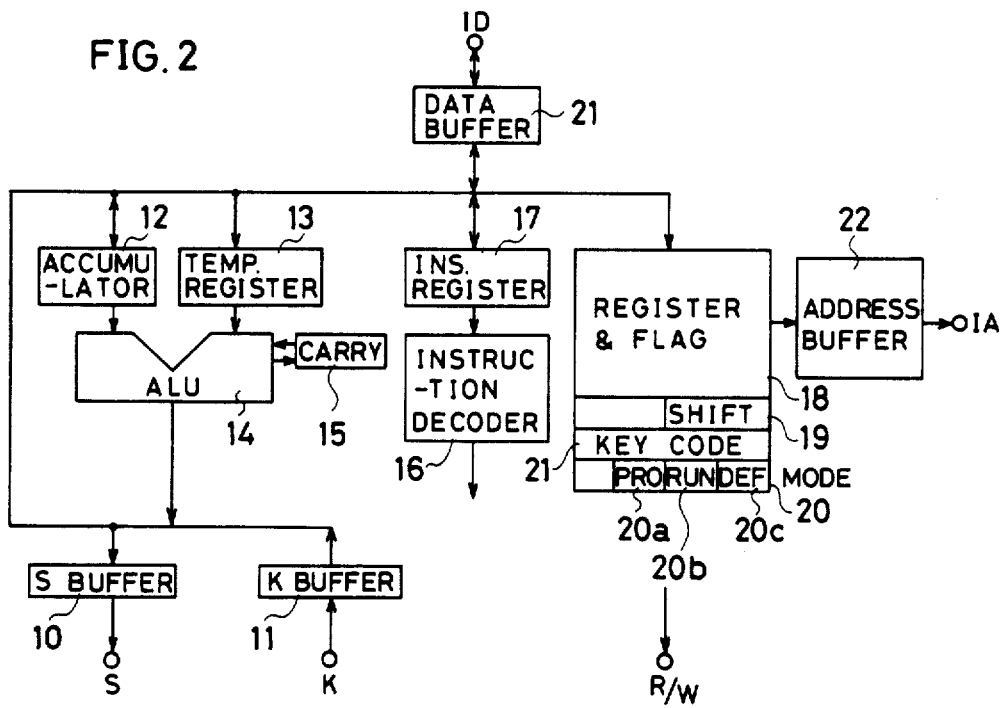
FIG. 2 is a block diagram of an essential part of CPU in the embodiment of FIG. 1.

FIG. 2 shows a major portion of CPU 1 which includes a strobe buffer 10 for supplying the strobe signals to the respective keys 4, a buffer 11 for storing the keyed information via the keys 4, an accumulator 12, a temporary register 13, an arithmetic logic unit (ALU) 14, a carry storage 15, the instruction decoder 16, the instruction register 17 and a register and flag 18. A SHIFT flag 19 provides a signal indicating whether the SHIFT key has been actuated. When recognizing a particular key signal by monitoring the flag 19, CPU 1 can check whether the SHIFT key has been actuated before that particular key signal. After checking, the SHIFT flag 19 is reset.

MODE 20 comprises three flags PRO, RUN and DEF which are flags indicative of which operating state the calculator is now in. Only one of these flags is permitted to be in set state. The PRO mode is used to set up programs and more particularly is in operation in writing and reading the programs with the flag 20a being set at this time. The RUN mode is used in executing the programs or executing non-programmed or manually instructed calculations and the flag 20b indicates that the calculator is in this mode. The DEF mode is a mode which executes a particular program beginning with a step corresponding to a particular key K depressed after actuation of the SHIFT key 4a. It is appreciated that the calculator operates in the order of PRO DEF RUN PRO each time the MODE key 4b is depressed.

A key code storage 21 is responsive to actuated ones of the keys 4 to temporarily store codes obtained from combinations of the keyed signals and store signals or code signals of a different notation but based on that resultant code signals.

Figures 3, 4, 5:
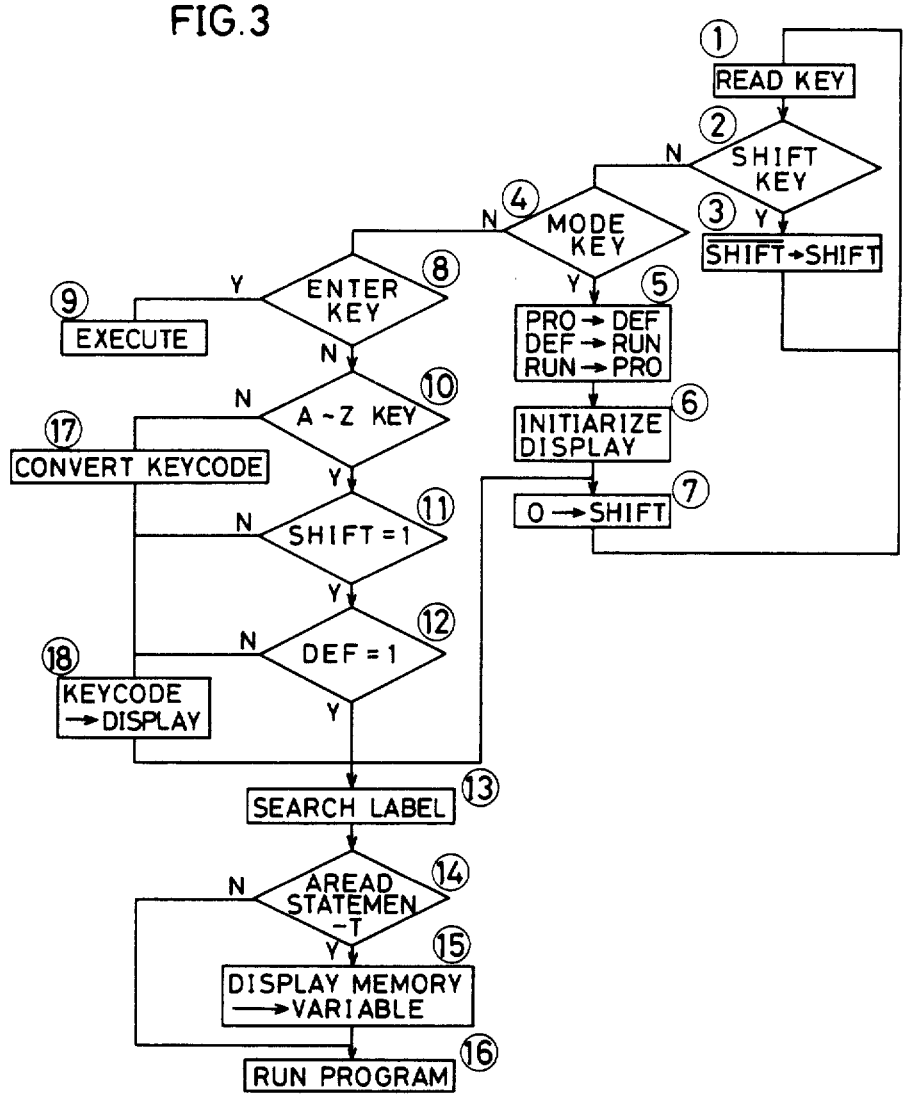
FIG. 3 is a flow chart of a stored program used in the embodiment of FIG. 1.
FIG. 4 is a view of an example of an arrangement of a calculation program.
FIG. 5 details the calculation program shown in FIG. 4.

As will be more clearly understood in view of the following, ROM 2 stores programs corresponding to a flow chart of FIG. 3. In the following there is illustrated the calculator wherein a BASIC language is employed.

(1) The calculator is ready to receive a new key signal. Upon introduction of the key signal its associated key code is properly encoded and loaded into the key code storage 21.

(2) It is decided whether the actuated key is the SHIFT key.

(3) Where the SHIFT key has been actuated, the SHIFT flag 19 is inverted.

(4) Whether the actuated key is the MODE key is sensed.

(5) When the MODE key is actuated, the mode flags 20a to 20c are selectively set or reset.

(6) Display is initiated.

(7) The SHIFT flag 19 is cleared before the keys are monitored.

(8) Whether the actuated key is the ENTER key is decided.

(9) If the ENTER key has been actuated, then the calculator is about to execute an instruction based on the keyed inputs. For example, when RUN is selected and the mode is either RUN or DEF, the calculator proceeds with executing the programs. If NEW, then the program is cleared.

(10) Whether the actuated key is one of alphabetic keys A-Z is sensed.

(11) Where the actuated key is any of A-Z, whether the SHIFT key has been actuated immediately before is decided by monitoring the flag 19.

(12) If the SHIFT key has been actuated immediately before, it is checked by use of the flags 20b and 20c as to whether the mode is DEF.

(13) When the mode is DEF, the calculator is ready to execute the program and looks for a step to start running the program. In other words, the calculator looks for a label corresponding to an introduced one of the alphabet letters A-Z from the beginning of the program. Each line of the program is constructed as shown in FIG. 4. Each line may include one or more instructions. An example of the program line is depicted in FIG. 5 wherein the label is defined between quotation marks (V). The searching of the label is achieved by seaching for a label which is identical with the key code as keyed in ("A" in the example of FIG. 4). If the corresponding label is not found, then the calculator is in error and the display panel notifies the operator of such error.

(14) If the corresponding label is found, then the calculator starts executing the program beginning with that line. Before that, determination as to whether the label is followed by a statement or instruction "AREAD" should be carried out.

(15) If the answer is affirmative, then the statement AREAD permits the previous contents of the display panel to the loaded into the address of RAM corresponding to a specified variable (in the case that the contents are a calculation formula, the results thereof are loaded).

(16) After execution of the statement "AREAD" the calculator is about to execute the next succeeding instruction. When the statement "AREAD" is not found in (14), this step is immediately effected.

(17) If the keyed input is not any of the alphabet letters A-Z in (10), then conversion of KEY CODE is effected once more. Where other keys are assigned a second function, this second function is called for upon actuation of the SHIFT key immediately before introduction of any of these other keys, such key codes should be converted. For the CL (clear) key, the ► key (cursor right key), the ◄ key (cursor left key), etc., which are not directly displayed on the display panel, proper treatments are carried out and followed by (7).

(18) The contents of the key code storage 21 is transferred to a proper memory location and displayed on the display panel.

The calculator embodying the present invention will now be described by referring to the exemplary program. Assuming that a number of lines are programmed in the calculator, the results of calculations (or specific data) will be loaded at the address corresponding to the variable A (10) in the following manner based on the stored program at the line bearing the label A at its beginning. For example, when the program of FIG. 5 is located in line 10, the MODE key 4b is first actuated to set up the DEF mode in order to start executing the program beginning with this line. Under these circumstances, when the SHIFT key 4a and the alphabet key "A" are actuated, the calculator seeks the program with the label "A". When the label "A" and the statement "AREAD" are sequentially fetched from line 10, upon fetching the statement "AREAD" the data stored in the display memory 5 is loaded into the memory location of the address corresponding to the variable "A" in (10). Then, the next succeeding program "GOSUB 300" is executed.

In the above example, where for example "5×3" are inputted and displayed in the form of "5×3_" (where _: cursor) on the display 6 followed by actuation of the keys "SHIFT" and "A", the label "A" is read out from line 10 and the statement "AREAD" is fetched. Consequently, CPU 1 effects the above shown calculation with the results being loaded into the address of RAM 22 which corresponds to the variable A in (10) as specified by the program in line 10.

Upon actuation of the ENTRY key subsequent to the display of "5×3_", the already calculated result or "15" is loaded into the display memory 5 and the display 6 displays "15.". When the SHIFT and A keys are actuated under these circumstances, the label A is fetched from line 10 and loaded into the address of RAM 2 corresponding to the variable A in (10).

It is understood that the statement "AREAD" is executed when the calculator is in the DEF mode and present immediately after the label at the beginning of execution of the program. Otherwise the statement is skipped. This implies that the contents of the display memory is unclear when the statement "AREAD" appears in the course of program execution.

FIG. 6 shows an example of the operators preconstructed program and FIG. 7 is an example of key operations and display patterns. For example, when 5×6 is keyed into the keyboard, the display memory 5 is loaded with these keyed inputs and the display panel 6 displays "5×6". Subsequently, when the keys SHIFT and A are actuated, the calculator searches for the line bearing the label A. If the label A and the leading label in the program agree or if the line with the label A is located, then the calculation "5×6" is carried out with the results thereof being loaded into the address of RAM 33 corresponding to the variable space "X". Then, the next succeeding line is carried out so that its result or "10" is loaded into the address corresponding to the variable space "Y" in line 20. Because the next succeeding line 30 is the statement "AREAD", this step is skipped and followed by line 40. The statement "PAUSE" instructs the display that it will continue displaying a specified variable for 1 second or so. In this case, the contents at the address of RAM corresponding to the variable "X" are displayed on the display panel 6 for 1 second or so. That is, 30. is displayed as shown in FIG. 7. Through execution of line 50 the contents stored at the address of RAM 3 corresponding to the variable "Y" are displayed on the display 6 for 1 second or so. Since the contents at the address corresponding to "Y" are "10" introduced during line 20, the display panel 6 displays "10".

When the keys SHIFT and B are actuated in the named sequence after "8×2", the calculator starts running the program in line 30. The address corresponding to the variable "B" is loaded with the results of "8×2" or 16. Thereafter, execution of line 40 results in displaying the contents "30" stored at the address corresponding to the variable "X" on the display panel 6 and execution of line 50 results in displaying "16" on the panel 6.

As stated previously, the programmable calculator embodying the present invention is adapted so that, when the key is actuated to specify a particular label, it executes the program beginning with the line bearing that particular label and loads the contents of the display memory immediately before that key actuation into a desired address of the memory. When it is desirable to load particular data in a desired line in the course of program execution, the particular data is inputted or outputted in advance and the label specifying key or keys (SHIFT and A in the above example) are actuated so that the particular data can be inserted into the desired line at the beginning of running the program. It is obvious that the SHIFT can be used alone or in combination with any alphabet key or the like for the purpose of the present invention.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A programmable calculator for manipulating keyed information in accordance with a stored program, said calculator comprising:

key input means for receiving keyed information;

step selection means for selecting a program step requiring desired information;

means, responsive to said key input means and said means for selecting, for locating when said calculator is in a define mode said desired information with said entered keyed information; and means responsive to said step selection means for initiating and running the stored program beginning with said selected step by utilizing said located desired information.

2. The calculator of claim 1 further comprising display means responsive to said key input means for visually displaying said keyed information and said corresponding desired information.

3. The calculator of claim 1 wherein said means for running skips other nonselected program steps requiring location and utilization of other desired information during the running of said program.

* * * * *